BALANCED SENSE LINE MEMORY

Filed Nov. 30, 1961

INVENTOR.
JACK I. RAFFEL
BY
Robert J. Horn Jr.
ATTORNEY 3,144,641
Patented Aug. 11, 1964

3,144,641

BALANCED SENSE LINE MEMORY

Jack I. Raffel, Groton, Mass., assignor to Massachusetts Institute of Technology, Cambridge, Mass., a corporation of Massachusetts Filed Nov. 30, 1961, Ser. No. 156,008
12 Claims. (Cl. 340—174)

This invention relates to binary information sensing apparatus and more particularly to apparatus which is used to detect the direction of magnetization of thin film storage elements of a digital memory array.

A thin-film memory system which may be used in practicing the present invention is described in my previous application, Serial No. 23,269, for a "Thin Film Memory System," filed April 19, 1960. In the aforesaid application, the details of operation of the thin-film memory are discussed. Briefly, in the invention disclosed therein thin film magnetic spots are deposited in rows and columns on a glass substrate with the easy or preferred direction of magnetization of the spots oriented in the direction of the rows. In the word organized memory used in describing the invention, the word lines are in the row direction and the digit lines are in the column direction as are the separate sense lines. Current pulsing of a selected word line causes approximately 90° rotation of flux in the magnetic spots in the row acted upon by said selected word line. The direction along the easy axis of the magnetic field in each of the spots before rotation is determined by sensing with the sense line the direction of rotation of flux in each spot at the time the word line current pulse is applied. This sensing is called "read out." Since read out with a large word line current pulse destroys the original direction of magnetization in the magnetic spots, current pulses are applied to the digit lines after read out and before termination of the word line current pulse. The direction of the current pulses in the different digit lines at the termination of the word line current pulse determines the residual direction of magnetization in each thin film spot in the selected row. This is called "write in." Subsequent termination of the digit line current pulse completes the "read out-write in" cycle.

Read-out sensing is done in the previous application by using a separate sense line which is parallel to and slightly displaced from the digit line. The sense line lies over the magnetic spots in a column and is responsive to rotation of flux in any of said spots. A separate sense line is used for each column and the positive or negative pulse (depending on the original direction of magnetization along the easy axis of each row spot) generated in each sense line upon initiation of the word-line current pulse is termed the "signal." In order to avoid interference with this desired signal by the subsequent application of the digit pulse, the undesired coupling between the sense line and the digit line is minimized by using separate lines for digit and sense and physically separating them to the maximum consistent with both lines still coupling to the magnetic spot. A common sense-digit line would result in so great an interference signal level (hereafter called "noise") in the sense line that maximum repetition rate for the signal would be much smaller than could be obtained by a separate sense and digit line.

The system described in my previous application functions satisfactorily, but if speed of operation is to be increased and very large arrays used without reducing signal reliability because of noise, the apparatus of the invention to be described herein is preferred.

One limitation on the cycle time (time required to read-out and write-in information into an individual magnetic element of a complete memory array) is imposed by the necessity for being able to distinguish with high reliability between the signal on the sense line and other noise components which are also present on the sense line. If the signal and noise are separated in time (as from noise produced by the digit-line current pulse) then reliability may be enhanced by increasing this time separation at the expense of an increase in cycle time. If the signal and noise occur concurrently (as from noise produced by the word-line current pulse), no time separation is possible. In both instances, however, a reduction in the amplitude of the noise will assist in reduction of cycle time. It is, therefore, an object of this invention to minimize the noise level with which the signal must compete at least at the input terminals of the amplifier connected to each sense line. Inasmuch as the noise level generally increases with the size of the memory array, it is a further object of this invention to allow construction of large memory arrays without increasing the cycle time and reducing reliability.

As described above, the signal occurs at the time the word-line current pulse is applied. Since this signal must be distinguished from noise introduced in the sense line by the current pulse on the word line, minimum noise contribution is desired. Since the word line is in a row direction and the sense line is in the column direction, little inductive coupling exists and noise is introduced into the sense line primarily by capacitive coupling at the crossover points of these lines. Reduction of this capacitance by physical separation of the lines is limited by the requirement that both lines be closely coupled to the magnetic element. It is, therefore, a further object of this invention to minimize the effect of noise introduced into the sense line by coupling of the word-line current pulse, by introducing an opposing noise into the sensing circuit to produce noise cancellation in the sense cicuit without adversely affecting the signal.

Another contribution to noise in the sense line occurs when the digit-line current pulse is applied. If the digit line and the sense line are separate lines, the noise is introduced into the sense line primarily by induction coupling. Physical separation of these lines to the utmost consistent with the requirement that the lines be closely coupled to the magnetic elements in the column over which the lines pass is resorted to to minimize the noise. Although the noise introduced by the digit current pulse occurs subsequent to the signal pulse on the sense line, the noise is detrimental to speed capability of the memory array. This increase in cycle time of the memory is caused by a tendency for the sense line noise to overload the sense amplifiers and thereby decrease the threshold safety factor used to determine presence of a signal. In order to maintain reliability, the signal may not be applied to the sense amplifier until sufficient time for recovery from the noise overload. Another reason for increased cycle time is that the noise occurs as a transient waveform which must diminish to a low level before the next signal can be produced by a word-line pulse current. It is, therefore, a further object of this invention to decrease the cycle time by cancelling out the noise produced on the sense line by the digit-line pulse current.

Because of the large magnitude of the noise which would occur in the sense amplifier if the digit current pulse were applied to a line which served the dual function of digit line and sense line, a system such as described in my previous application which is modified to use a common sense-digit line would have a much larger cycle time than if separate sense and digit lines are used. However, a memory system which uses a common sense-digit line is otherwise desirable from a construction viewpoint. It is, therefore, a further object of my invention to provide a memory system which has a common sense-digit line without increasing the cycle time over that which would be required if separate sense and digit lines were used. However, the present invention may be used with separate sense and digit lines with somewhat better noise reduction without substantial increase in construction complexity.

The present invention accomplished its objects by intentionally introducing noise into a modified sensing system of a thin-film memory array in such a way that the undesired noise is essentially cancelled whereas the desired signal is unaffected.

The principles of the invention will be better understood from the following detailed description taken in conjunction with the accompanying drawings which show illustrative embodiments of the invention.

Figure 1:
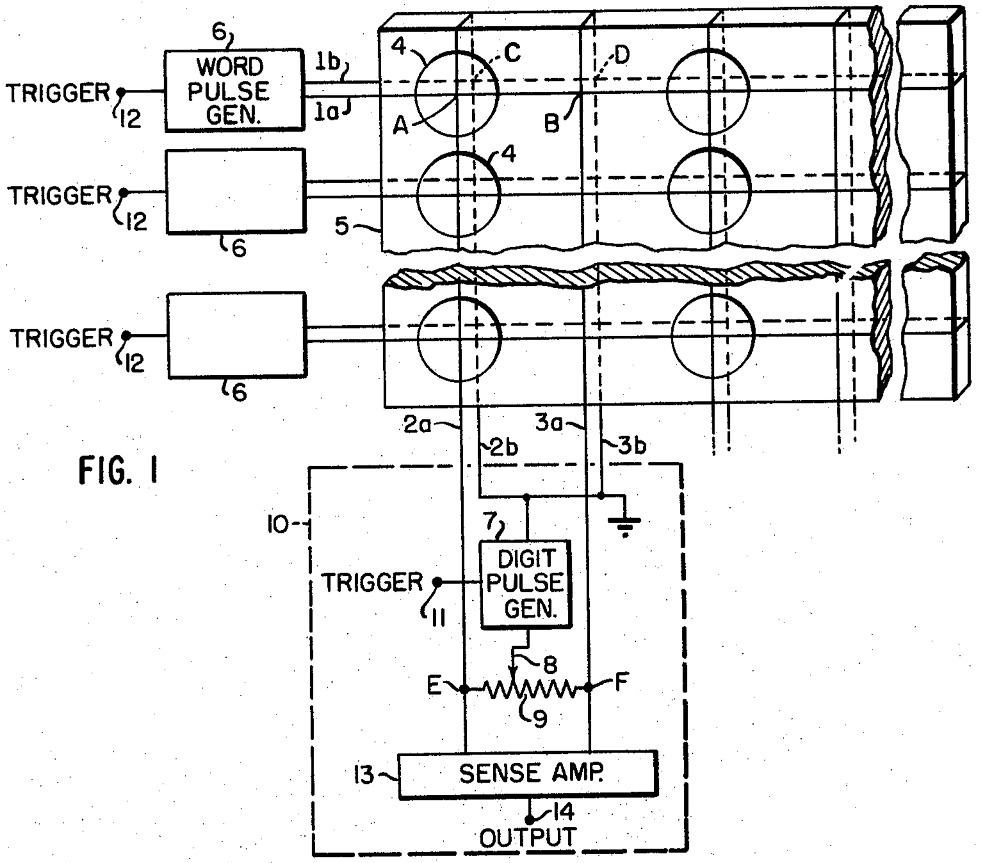
FIGURE 1 shows a thin film memory array with a basic balanced sense line signal sensing system.

The principle of operation of the present invention is best described by referring to the memory array of FIGURE 1. Word line 1 is energized by a pulse of current from word pulse generator 6 initiated by a trigger 12 which is supplied by a word line selector matrix (not shown) commonly employed in digital computers. This pulse of current will cause a voltage with respect to ground potential to exist on line 1. A voltage $V_a$ will exist on line 1 at point A which is the point of crossover of word line 1 and combined sense-digit line 2. Similarly voltages $V_b$, $V_c$ and $V_d$ will exist on line 1 at points B, C and D respectively. The voltages on line 1 will exist because of the voltage drop produced by the current pulse flowing through the impedance of line 1. Since the length of line $1_a$ between points A and B is small, the voltages $V_a$ and $V_b$ will be very nearly equal; as will be the equality of voltages $V_c$ and $V_d$ on line $1_b$ for the same reason. Since capacitance exists between line $1_a$ and sense-digit line $2_a$, and between lines $1_a$ and $3_a$, the change in voltages $V_a$ and $V_b$ from their initial to final values at the time pulse current is applied to word line 1 will produce a capacitive current in sense-digit lines $2_a$ and $3_a$. Ideally, the capacitive currents introduced into lines $2_a$ and $3_a$ at points A and B are equal because of construction symmetry. These capacitive currents will cause a voltage $V_e$ and $V_f$ to appear at points E and F because of the impedance of lines 2 and 3. If the capacitive currents and the impedances are equal, voltages $V_e$ and $V_f$ will be equal. A differential amplifier used as the sense amplifier 13 will produce no response at its output 14 for the case where $V_e$ and $V_f$ are equal, assuming an ideal differential amplifier. This is a desired result, namely no output because of noise introduced into the sense amplifier 13 because of a current pulse on a word line.

A similar explanation can be used to show that voltages $V_c$ and $V_d$ at points C and D of line $1_b$ when capacitively coupled to lines $2_b$ and $3_b$ will result ideally in equal voltages at points E and F and hence no response at output 14.

A balancing potentiometer (not shown since it is generally connected to the input terminals of a differential amplifier as an integral part thereof and with center arm connected to ground) is adjusted to equalize $V_e$ and $V_f$ for optimum cancellation in the differential sense amplifier 13.

The current pulse on word line 1 produces a signal on the sense-digit line 2 at the same time that the capacitive noise current is produced. The 90° flux rotation produced by the word line pulse current in all thin-film memory elements 4 on glass substrate 5 which lie under word line 1 produces a signal in each sense-digit line coupled to each of these row memory elements. Since sense-digit line 2 is coupled to a memory element 4 lying under word line 1, a signal will be induced in line 2. However, line 3 is a dummy sense-digit line since it does not lie directly on a memory element 4 and any signal occurring in line 3 (negligible compared to the signal on line 2) is produced by undesired coupling to magnetic elements on either side of line 3. Therefore, a signal voltage will appear at point E and not at point F, which difference in voltage will be amplified by sense amplifier 13 and appear at output 14. This signal voltage will be essentially the same as if sense-digit line 3 were not present as in my previously filed application.

As explained earlier, a current pulse must be applied to the sense-digit line in order to write-in information into a row of memory elements which have been subjected to a word-line current pulse. This current pulse is generated in FIGURE 1 by applying a trigger 11 obtained from a conventional digit selector matrix (not shown) of a digital computer to digit pulse generator 7. The pulse is delivered through potentiometer 9 to sense-digit lines 2 and 3 whereby a voltage will appear at both points E and F. The position of arm 8 of potentiometer 9 is adjusted for minimum noise at output 14 of sense amplifier 13 when digit pulse generator 7 is triggered.

Although a common sense-digit line results in simpler construction of the thin film memory, a separate digit and sense line may be used in place of each sense-digit line if lower noise levels are desired. As an example of how separate sense and digit lines can be used in the present invention, reference may be made to FIGURE 1. Sense amplifier 13 is disconnected from points E and F and is instead connected to two sense lines (not shown) which are adjacent to lines 2 and 3 now serving solely as digit lines. One end of each sense line is grounded and the other end of each line is connected to sense amplifier 13. One of the sense lines would be adjacent to line 2, while the other would be adjacent to line 3. Inductive coupling between the digit and sense lines would cause digit pulse current noise voltages at the input terminals of sense amplifier 13 which could be balanced out by adjustment of arm 8 as is done in the common sense-digit line case. Similarly, the internal balancing potentiometer of sense amplifier 13 balances voltages induced in the sense lines by the current pulse on word line 1. The desired signal will occur only on the sense line adjacent to line 2, both lines being coupled to the thin film memory elements 4 in a column.

Preferred construction when separate sense and digit lines are employed calls for centering the sense line on the magnetic elements and making the sense line narrower than said elements. The digit line is insulated from and placed directly over said sense line and is usually the same width as said magnetic elements. This geometry is considered to function more effectively than where the digit and sense lines are co-planar and of necessity narrow in width compared to the magnetic element width since both lines must couple to said magnetic element.

Figure 2:
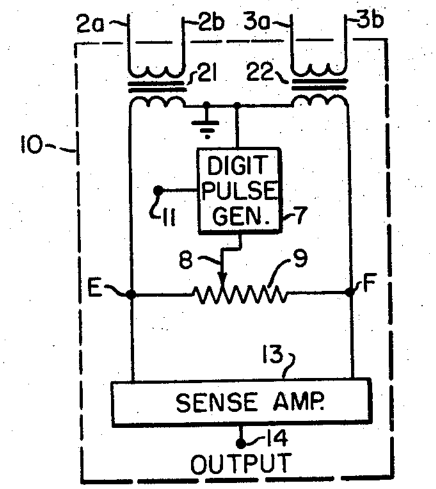
FIGURE 2 shows a modification of the sensing system.

An improvement of the balanced sense line invention is shown in FIGURE 2 where only that portion of FIGURE 1 indicated as 10 is shown. The sense-digit lines 2 and 3 are removed from a direct connection to ground by the isolation produced by transformers 21 and 22. Transformer 21 (22) produces an additional series capacitance between line 2 (3) and ground. Since insertion of series capacitance between an element and ground reduces the capacitance of the element with respect to ground, a reduction in the magnitude of the capacitively induced current (noise) in line 2 (3) because of the pulse current in line 1 results. Thus transformers 21 and 22 are effective in reducing the magnitude of the noise in each sense-digit line and are thus effective in reducing the cancelled noise at output 14 if they are well matched in both leakage and magnetizing inductance. However, some performance degradation occurs because of limited low frequency response of these transformers which in turn causes reduction in signal threshold safety factor because of a shift in the reference level (base line) when the repetition rate of the applied current pulses is varied.

Figure 3:
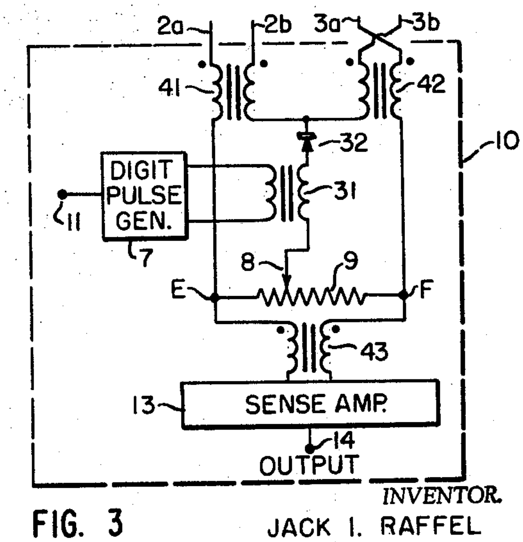
FIGURE 3 shows the preferred embodiment of the sensing system.

FIGURE 2 performance may be improved by transformer coupling digit pulse generator 7 rather than using a direct connection. Transformer coupling is preferred because the direct connection of digit pulse generator 7 to arm 8 as in FIGURE 2 causes points E and F to experience large voltage excursions when generator 7 is turned on and off because of the supply voltage of generator 7. Transformer coupling eliminates this source of noise voltage at points E and F and results in better noise cancellation than direct coupling. A diode in series with the transformer secondary speeds up recovery of the circuit at the end of the digit current pulse. Transformer 31 and diode 32 of FIGURE 3 show this transformer coupling circuit which may be applied to FIGURE 2. The ground connection of transformers 21 and 22 in FIGURE 2 may be removed, and somewhat improved noise reduction is thereby obtained.

The preferred embodiment of the invention is the circuit of FIGURE 1 with unit 10 replaced by that shown in FIGURE 3. The transformers 41, 42 and 43 perform the function of reducing the amplitude of the noise voltage presented at the input of differential sense amplifier 13. Transformers 41, 42 and 43 are closely coupled transformers which are connected to function as common-mode current rejection type chokes. As an illustration of the method of operation of such choke, consider that currents are capacitively coupled to sense-digit line 2 by a pulse on word line 1. The currents in lines $2_a$ and $2_b$ will be directed toward or away from the transformer 41 depending upon the polarity and direction of change of the voltages at points A and C. The polarity of the windings of transformer 41 is such that the transformer windings present a high impedance to these common-mode currents. However, signal information obtained by rotation of the magnetic field in the magnetic element 4 by the current in line 1 causes the direction of current in line $2_a$ to be opposite in direction from that in line $2_b$. The transformer 41 presents low impedance to these opposed-direction signal currents and the signal on sense-digit line 2 is available undiminished in amplitude to be amplified by the sense amplifier 13. Transformer 42 in sense-digit line 3 operates in the same way as far as suppressing the capacitively coupled noise produced by a pulse of current on the word line 1. No signal is produced on sense-digit line 3 by a pulse current in word line 1 because line 3 does not couple to a magnetic element 4.

The transformer 43 will suppress voltages of the same polarity (which produce common-mode currents) at terminals E and F produced either by the capacitively coupled currents in lines 2 and 3 by pulse current in word line 1 or by a pulse of current from digit pulse generator 7. Since the desired signal produced by rotation of flux in element 4 will appear essentially only at terminal E, transformer 43 will not impede transfer of the signal to the sense amplifier 13. It will be apparent to those skilled in the art that FIGURE 3 may be modified to function with separate sense and digit lines. The modifications consist of connecting those components associated with the digit pulse current generator 7 to the digit lines and those associated with the sense amplifier 13 to the sense lines. A component, such as transformers 41 and 42, which is in both digit and sense circuits may be required to be duplicated in the sense and digit lines.

Although this invention has been described as a modification of the information sensing portion of a word-organized thin film memory of the type described in my earlier application, the invention is not to be construed as being limited to that preferred mode of operation. The principle embodied in my invention may be applied by those skilled in the art to other coincident current memory systems such as the type briefly described in my earlier application. Any memory system has in common with others the necessity for a sense winding which senses flux change in a thin film element. In accordance with this invention a second sense winding is placed adjacent to the required sense winding so that both windings are responsive to interference sources to produce equal noise but said second sense winding is unresponsive to flux change in the thin film elements. These windings are connected in a balanced bridge arrangement where undesired noise pick up is cancelled, whereas the signal from a magnetic element is available.

Additional examples of modifications of the present invention which do not depart from the scope of the invention are to be found in thin-film memory systems which do not use individual spots for bit storage but rather depend on the localized field of the energizing and sensing conductors to provide individual bit storage on a continuous thin-film magnetic sheet.

One possible configuration of such a memory system incorporating this invention is to have strips of thin-film magnetic material oriented in the column direction with a space between the strips. The width of the strips would be approximately that used in individual spots. The space between strips would be approximately the space between columns of spots. The localized field of the word drive lines in the column direction would cause separation of word information on said strips if the word drive line spacing is sufficiently large. The sense-digit line 2 and the dummy sense-digit line 3 of FIGURE 1 would be placed on the column strips and in the space between strips respectively. Otherwise the system is similar to FIGURE 1 and its possible modifications in FIGURES 2 and 3. Likewise, separate sense and digit lines may be employed.

Another possible configuration which may be adapted to incorporate this invention is a system which employs a continuous sheet of thin-film magnetic material in both row and column directions. In this case, it is necessary to locate the dummy sense-digit (or separate dummy sense line and digit line) remote from said thin-film material to avoid sensing a full amplitude signal which would effectively cancel the desired signal on the sense-digit line in the balancing network. The physical location of the dummy sense-digit lines is limited only by the requirement that inteference noise signals induced in said dummy sense-digit lines are sufficiently similar to the noise signals induced in the sense-digit lines so that cancellation may be obtained.

I claim:

1. In a thin film magnetic memory array of the type having rows and columns of discrete spots of magnetic material possessing an easy axis of magnetization in the direction of said rows and in which binary information is stored as the direction of remanent flux along the easy axis of a spot, information sensing apparatus comprising, selection means for rotating the remanent flux of a spot in a given row, sensing means coupled to said magnetic spot in a given column and responsive to flux rotation to produce an output signal related to the state of remanent flux in the spot selected by said selection means, said sensing means being coupled to said selection means to produce a first noise signal independent of the state of remanent flux of said selected spot, balancing means coupled to said selection means to produce a second noise signal substantially identical to said first noise signal, and a network to combine the signals of said sensing means and said balancing means to cause said second noise signal to cancel said first noise signal producing an output substantially equal to said output signal whereby said output corresponds to the information stored in said selected spot.

2. Apparatus defined in claim 1 including, writing means to apply a magnetic field along the easy axis to each spot in a given column.

said network being adapted to cause a third noise signal produced in said balancing means by said writing means to cancel a fourth noise signal similarly produced in said sensing means.

3. In a thin film magnetic memory array of the type having rows and columns of discrete spots of thin-film magnetic material having an easy axis of magnetization in the row direction and in which information is stored as the direction of remanent flux along the easy axis of a given spot, an information sensing apparatus comprising, a first plurality of conductors, a first plurality of pulse current sources, each of said first conductors being connected to a different source of first pulse current and being coupled to a different row of said spots when conducting current to produce rotation of the remanent flux of each of said row spots, a second plurality of conductors, each of said second conductors being coupled to a different column of said spots and responsive to flux rotation therein to produce an output signal with polarity related to the direction of remanent flux before rotation in a magnetic spot common to said different row and column, each of said second conductors also being coupled to each of said first conductors whereby said first conductor current produces a first noise signal in each of said second conductors, a third plurality of conductors, each of said third conductors being coupled solely to each of said first conductors whereby said first conductor current produces a second noise signal in each of said third conductors, said second noise signal being substantially the same as said first noise signal, a first network to pair adjacent second and third conductors to cause said first noise signal and said second noise signal to cancel whereby said output signal is available at said network.

4. The apparatus as in claim 3 comprising in addition:

A second plurality of sources of pulse current, adjacent paired conductors of second and third plurality of conductors connected to one of said second sources of pulse current by a second network, current from said second source producing a third and fourth noise signal in said adjacent paired conductors, said second network adjusted to make said third and fourth noise signals substantially identical, said first network also causing said third and fourth noise signals to cancel.

5. The apparatus defined in claim 3 including, a second plurality of pulse current sources fourth and fifth conductors to close physical relation to said second and third conductors respectively, each of said fourth conductors being coupled to a column of spots, said first conductors, and one of said second conductors, each of said fifth conductors being coupled to said first conductors and to one of said third conductors, a second network connecting each of said second sources of pulse current to adjacent ones of said fourth and fifth conductors, whereby a pulse of current from said second source into said adjacent fourth and fifth conductors causes third and fourth noise signals in said paired adjacent second and third conductors respectively, said second network adjusted to cause said third and fourth noise signals to cancel in said first network.

6. The apparatus of claim 5 wherein said first network comprises a differential amplifier connected to said adjacent second and third conductors to provide amplification of the difference in signals on said second and third conductors whereby said amplifier output is substantially said output signal.

7. In a word organized memory of the type having rows and columns of individual thin film magnetic memory elements with easy axis of magnetization in the row direction and in which binary information is stored as the direction of remanent flux along the easy axis of a spot, information sensing apparatus comprising, a word line pulse generator, a plurality of individual word lines each coupled to a single row of said memory elements and adapted when selectively energized by current from said pulse generator to apply a magnetic field transverse to said easy axis whereby the remanent flux in the elements of a selected row is rotated from the easy axis direction, a plurality of individual column lines each coupled to a single column of said memory elements and responsive to flux rotation of one element of said selected row to provide an output signal, a plurality of individual intercolumn lines, each line being placed between adjacent columns of said memory elements and relatively unresponsive to rotation of remanent flux in said elements, said column and intercolumn lines being also coupled to said word lines whereby a current pulse in any word line produces first and second noise signals in said column and intercolumn lines respectively, a combining network for connecting a column line and an adjacent intercolumn line to produce cancellation of said first and second noise signals and to provide said output signal at an output terminal of said network.

8. Apparatus defined in claim 7 including, a plurality of digit pulse generators, each of said digit pulse generators being connected by a network to a column line and an adjacent intercolumn line wherby energization of said digit pulse generators causes a third and fourth noise signal on said connected column and intercolumn lines respectively, said combining network producing cancellation of said third and fourth noise signals.

9. In a word organized memory of the type having rows and columns of individual thin film magnetic memory elements with easy axis of magnetization in the row direction and in which binary information is stored as the direction of remanent flux along the easy axis of a spot, information sensing apparatus comprising, a plurality of word line pulse generators, a plurality of individual word lines each connected to a separate pulse generator and coupled to a single row of said memory elements when energized by current from said selectively triggered pulse generator to apply a magnetic field transverse to said easy axis whereby the remanent flux in the elements of a selected row is rotated from the easy axis direction, a plurality of individual sense lines each coupled to a single column of said memory elements and responsive to flux rotation in one element of said selected row to produce an output signal, a plurality of individual dummy-sense lines, each line being placed between adjacent columns of said memory elements and relatively unresponsive to rotation of remanent flux in said elements, said sense and dummy-sense lines being also coupled to said word lines whereby a current pulse in any word line produces first and second noise signals in said sense and dummy-sense lines respectively, a combining circuit for connecting one of said sense lines to an adjacent dummy-sense line to produce cancellation of said first and second noise signals and to provide said output signal, a plurality of digit pulse generators, a plurality of digit lines, a plurality of dummy-digit lines, a connecting network connecting a digit line and an adjacent dummy-digit line to a separate one of said plurality of digit pulse generators, individual digit lines each coupled to one column of said memory elements to produce a field in the direction of said easy axis in each of said column elements when energized by a current from one of said digit pulse generators, each of said digit lines being coupled to one sense line to produce a third noise signal in said sense line, individual dummy-digit lines each coupled to one of said dummy-sense lines by the field produced by current from said digit pulse generator to produce a fourth noise signal, said combining circuit producing cancellation of said third and fourth noise signals.

10. In a thin film memory system wherein binary information is stored in the film as the direction of remanent flux along the easy axis of magnetization of the film at locations defined by column and row coordinates, information sensing apparatus comprising, means for selectively applying a magnetic field transverse to said easy axis along any given row coordinate to cause rotation of the remanent flux in the locations so defined, sensing means for each column coordinate responsive to the flux rotation produced by said first named means to product a signal indicative of the information stored at the location so selected, said sensing means being also responsive to said selection means to produce a first noise signal, a noise pick up means responsive to said selection means and virtually nonresponsive to flux rotation in said film to produce a second noise signal substantially identical to said first noise signal, means to combine the signals of said sensing means for a given column coordinate with the signal of said noise pickup means whereby said first noise signal is substantially cancelled by said second noise signal yielding only said information signal in the output thereof.

11. A noise cancellation sensing circuit comprising a spot of thin-film magnetic material having an easy axis of remanent magnetization, a first conductor parallel to said easy axis, means for energizing said first conductor to magnetically couple to said spot to rotate said remanent magnetization, a second conductor transverse to said easy axis and responsive to said rotation to provide an output signal, said second conductor being electrically capacitively coupled to said energized first conductor to provide a first noise signal, a third conductor electrically capacitively coupled to said energized first conductor to provide a second noise signal, means connected to said second and third conductors to cancel said noise signals while providing said output signal.

12. A thin-film remanent-flux sensing current comprising a region of magnetic material having an easy axis of remanent flux magnetization, means for rotating the flux in said region to a direction substantially transverse to said easy axis, a first means for sensing the rotation of said flux to provide an output signal, said sensing means also being capacitively coupled to said rotating means to provide a first noise signal concurrent with said output signal, a second means capacitively coupled to said rotational means to provide a second noise signal concurrent with and corresponding to said first noise signal, a network for cancelling said first and second noise signals while providing said output signal.

References Cited in the file of this patent

UNITED STATES PATENTS

| | | |
|---|---|---|
| 3,030,612 | Rubens | Apr. 17, 1962 |
| 3,034,107 | Knowles | May 8, 1962 |